United States Patent [19]

Tyler

[11] Patent Number: 4,912,648

[45] Date of Patent: Mar. 27, 1990

[54] EXPERT SYSTEM INFERENCE ENGINE

[75] Inventor: Irwin Tyler, Scarsdale, N.Y.

[73] Assignee: International Business Machines Corporation, Armonk, N.Y.

[21] Appl. No.: 173,489

[22] Filed: Mar. 25, 1988

[51] Int. Cl.$^4$ ............................................. G06F 15/18
[52] U.S. Cl. .................................... 364/513; 364/300
[58] Field of Search .............................. 364/513, 300

[56] References Cited

PUBLICATIONS

A Fact Based Expert System Model; Sing Chi Koo; Expert Systems in Government Symposium; Oct. 24–25, 1985; IEEE Computer Soc. Press.

Primary Examiner—Allen MacDonald
Attorney, Agent, or Firm—Whitham & Marhoefer

[57] ABSTRACT

An expert system includes a knowledge base manager which is fact-based, as opposed to rule-based; i.e., a semantic network with tangled hierarchies. The system includes an inference engine which is capable of providing solutions to indeterminate problems with a high degree of confidence. "Entities"(e.g., propositions, fact and ideas) are understood in eight different ways depending on the context of entity relationships. Each such relationship may be characterized anywhere along a spectrum from strong to weak. The knowledge base is designed so that entities and relationships are easily modified. The analysis performed may be at any of various levels of detail. The system can accept data as keyed input as well as from independently executed programs. Results developed by the inference engine are presented in various levels of detail in terms of relative degree of agreement or divergence from anticipated conclusions and the inference engine's degree of confidence in the results.

6 Claims, 7 Drawing Sheets

EXPERT SYSTEM INFERENCE ENGINE

BACKGROUND OF THE INVENTION

1. Field of the Invention

The present invention generally relates to the field of artificial intelligence and, more particularly, to a fact-based (semantic network) expert system knowledge base manager and inference engine. As used herein, artificial intelligence means that part of computer science concerned with designing intelligent computer systems. Such systems are finding increasing application in problem-solving, logical reasoning, language understanding, programming, learning, expert systems, robotics and vision.

2. Description of the Prior Art

Expert systems, as a branch of artificial intelligence, exhibit characteristics normally associated with human behavior and are sometimes referred to as "knowledge-based" systems which use certain standardized processes and a database to provide a user interactive environment in the form of a "consultation dialog", just as the user would interact with a human expert. Such systems have been used with considerable success in the fields of chemical and geological data analysis, structural engineering and medical diagnosis.

Rules and their derivatives work best where the situation is clear and determinate, where answers to questions can be straight forward and unambiguous, where the expert is crisp about certainties, and where there are no obvious unknowns. In such an environment, the rules allow precise access to the knowledge database, providing an answer or advice with an apparently high confidence level. It is this type of environment that current expert system design assumes as a premise. Currently, expert systems rely on a series of rules which are analyzed essentially in a sequential, cascading fashion.

Consider, for example, expert systems in current use for medical diagnosis. Such systems work very poorly in providing medical diagnoses where information is not always known, the expert knowledge is not always clearly understood, and data (i.e., medical test results) are sometimes ambiguous. Nevertheless, the situation presented in the medical diagnosis application is really determinate; that is, the answers to questions posed by the system are straight forward and the information requested is completely known, at least in the ideal world. The expert system, of course, assumes an ideal world because it knows no better. That is to say that current systems do not have the same sense as humans about knowing when they might be wrong.

In current expert systems, the problem is really one of our own inability to provide all the pieces that would make a given problem solution an obviously clear, determinate and straight forward solution. A rule-based approach is reasonably appropriate to a medical diagnosis application, for example, because in this case a selection or tree search approach is ideal.

Consider in contrast to the prior applications of expert systems the problem of selecting a career path. This is a problem with numerous alternatives, variable over time and among individuals, using facts, feelings, possibilities and so forth, all mashed together into a set of cloudy answers, many of which can be simultaneously valid and conflicting. We do not know what makes these answers valid, nor do we really understand how the human mind itself manages to massage this information, or lack of it, to provide useful guidance. This is an indeterminate problem. All the factors can never be known, and it is impossible to map the interaction of these factors.

A piece of information or fact has no relevance by itself. Only when it relates to another piece of information or to an emotion does the human mind make sense of that information. Somehow, our brains are able to handle these problems unconsciously. In an effort to mimic the reasoning of the human brain, various mathematical models have been proposed to simulate imperfectly, but sometimes quite effectively, the reasoning process. However, we human beings handle complexities like those found in the career path problem very poorly on an objective, conscious level. We often fool ourselves by throwing numbers and formulas at these problems, taking liberties with default values, averaging and grouping information in order to fit the one solution methodology we have learned.

What is needed for the indeterminate class of problem is a mechanism that:

1. Allows us to partition its complexities into very small, logically cohesive chunks.
2. Allows us to deal with these chunks independently.
3. Allows us to validly relate these chunks, that is, specify their relationships and influences on one another.
4. Mimics, as best we can know and define, the process by which the human brain understands these interrelationships.
5. Handles, reasonably and validy, information which is of dubious certainty.
6. Handles the removal, modification, or addition of information without ever producing confused or outrageous results; provided, of course, that the information/knowledge base is correct.
7. Provides we human beings with an indication of how confident it is in the results it produces.

SUMMARY OF THE INVENTION

It is therefore an object of the present invention to provide a new type of expert system which is effective in handling indeterminate problems with a high level of confidence.

It is another object of the invention to provide an inference engine for an expert system which is capable of processing information of dubious certainty.

It is a further object of the invention to provide an expert system inference engine which operates on an information/knowledge base in which the user specifies the relationships and influences of assertions in the database.

According to the present invention, a fact-based expert system, as opposed to a rule-based expert system, is provided. A fact-based expert system addresses the indeterminate problem by its very nature without the kind of shoehorn fit sometimes required to make the rule-based approach provide useful and confident results. The fact-based or semantic network expert system knowledge base manager and inference engine according to the invention "thinks" the way humans think by relating information tentatively where information is minimal and uncertain and more assuredly as more information becomes available and the available information is more certain. The system according to the invention can even recognize "I don't know" information as well. Thus, inexact or even only possible domain (i.e., problem scope) influences can be analyzed.

In a preferred embodiment of the invention, entities can be "understood" in eight possible ways in a knowledge base network, depending on the context of entity (i.e., piece of information) relationships. An entity may be able to influence another entity either positively or negatively, or negatively only, or positively only. Each relation may be strong or weak, according to a predefined weighting scheme.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
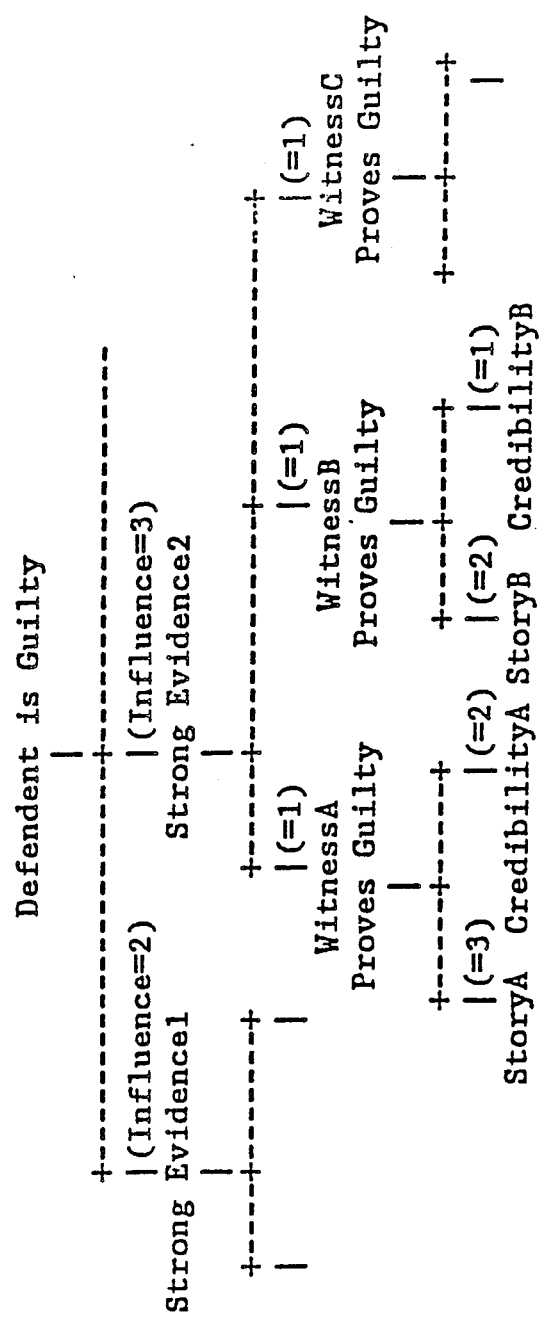
FIG. 1 is a semantic network which provides a conceptual illustration of the operation of the fact based expert system according to the invention by way of a specific example.

Referring now to the drawings, and more particularly to FIG. 1, there is shown by way of illustration a semantic network of a conclusion reached by a jury based on facts presented in a criminal trial. If Strong Evidence1 were absolutely proven, its influence on the jury's acceptance of the Guilty assertion (on a relative scale) is "2". Similarly, absolute acceptance of Strong Evidence2 has a weight of "3". But to arrive at this level, the jury needs the accumulated testimony of many witnesses. The weight of StoryA of WitnessA is "3" if it is complete. WitnessA may temper his certainty of StoryA with his own confidence factor. The psychiatrist's earlier testimony leads the jury to weight WitnessA's credibility at "2" as a maximum. However, the jury may temper this with a less than 100% certainty because he was drunk on the night of the robbery. Thus, the limited information in StoryA and the tainted CredibilityA give the jury a low WitnessA Proves Guilty influence factor of, say 0.4 on a maximum of 1. WitnessB has a weaker story ("2"), but he believes more details about that story (i.e., greater confidence). Even with lower CredibilityB ("1"), the greater confidence here (he had his glasses on and there was a full moon) can have WitnessB Proves Guilty influence factor turn out to be high, say 0.9 on a scale of 1.

As the fact based expert system according to the invention would handle this scenerio, the interactions are dealt with cleanly and simply. The Knowledge Engineer need deal with only one "influence in context" at a time and separately as follows:

WitnessA Proves Guilty—Story A
WitnessA Proves Guilty—CredibilityA

The inference engine knows how to combine these, as well as how to combine the various WitnessX Proves Guilty influences into a Strong Evidence2 conclusion.

To understand a semantic network as used by this invention, it should be recognized that a word in the fact-based system has no meaning until it is understood in a specific context. A computer system which emulates the human thought process, therefore, should be able to deal with ideas and "things" that have different nuances, and even very different meanings, depending on the context. Such a system should be able to accept whatever a human being accepts, whether strongly or weakly, whether by its existence or its absence or its opposite. Such a system should be able to understand when the information with which it is dealing is solid or fuzzy, well-understood of half guessed-at.

The subject invention makes available the power of a micro or so-called personal computer to find pragmatic, workable solutions to real-life problems for which complete information is not necessarily available and for which precise answers are not always possible. Most expert systems rely on a series of rules. The rules are analyzed according to the answers the user gives to a series of questions. Since a given rule may, in fact, be dependent upon another rule, it is illogical to start an analysis anywhere but at the top of a hierarchical list of rules and facts. Moreover, if one fact were missing from the analysis for any reason, a proper analysis might be either impossible or the conclusion reached might be faulty or misleading. In contrast, the fact-based system according to the invention allows conclusions to be reached the way people think; i.e., tentatively where information is minimal and uncertain. If new information becomes available, the user merely lets the system know and its conclusion becomes more certain. A given fact or item may be important to know in more than one context, in which case, the system allows the user to specify the item once and then use it in whatever contexts are appropriate. In rule-based systems, there are definite starting points that must be established in order for the whole to make sense. The fact-based system according to the invention allows the user to focus their analysis wherever they choose, making possible a human-like pattern of analysis.

Figure 2A:
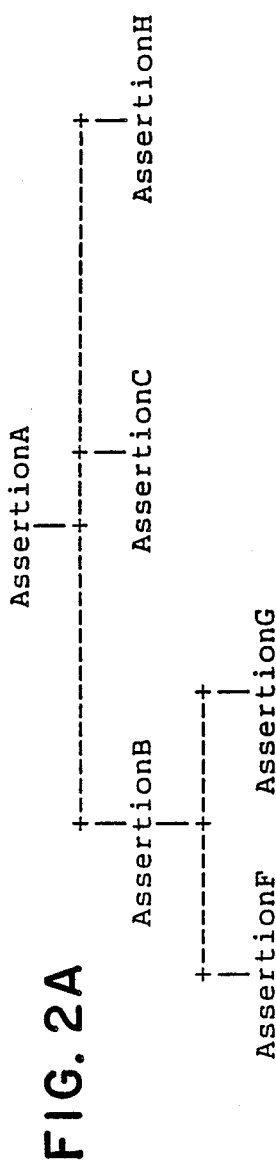
FIGS. 2A and 2B show, respectively, a simple hierarchical semantic network and a semantic network with tangled hierarchies.
Figure 2B:
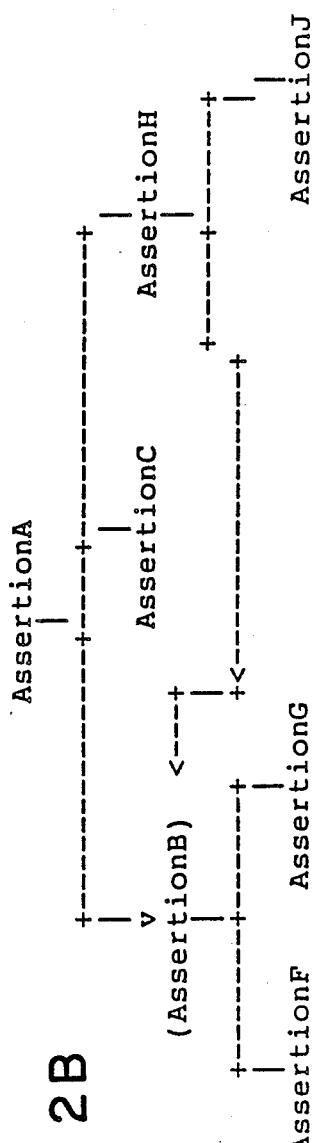
Figure 3:
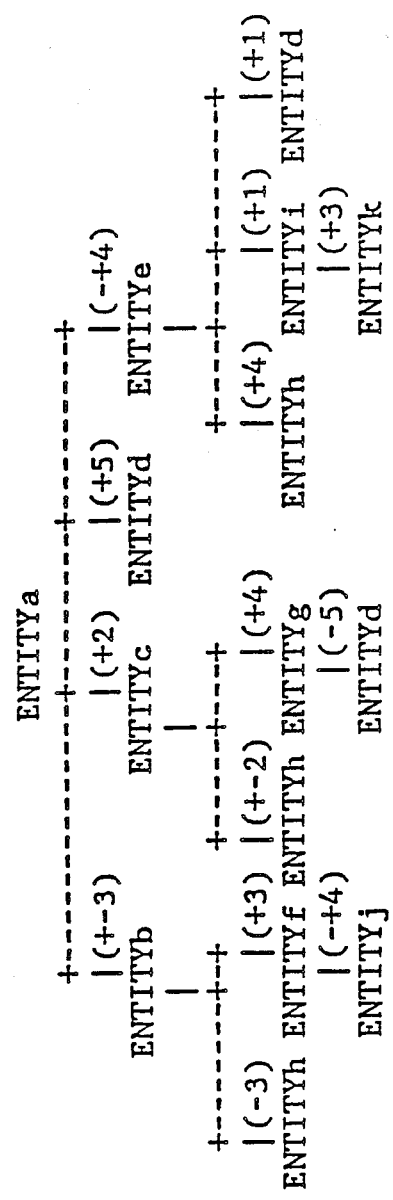
FIG. 3 is a semantic network, similar to FIG. 1, which provides a more general conceptual illustration of the operation of the invention.

To repeat, a piece of information has no relevance by itself. Only when it relates to another piece of information or to an emotion does the human mind make sense of that information. A given item may have different meanings and lead to different conclusions when related to many different items. As used herein, each item (or fact or simple thought) is an "entity" whose meaning is defined by its relation with another entity. These entities are prepared as an "assertion", or statement of "fact". These assertions are analyzed for their degree of truth. Linked together, these assertions define a "domain". Domains are made up of a network of linked assertions. Each link is an association (or context relationship). This network of assertions is called a "semantic network". The meaning of a link is that "AssertionB influences AssertionA." This influence can be a positive or a negative one and can be weak or strong, as illustrated by the example of FIGS. 1 and 3. Specifying these two influence factors establishes the context within which we understand the meaning of AssertionB. Within a domain, an AssertionA which has linked to it several influencing assertions (AssertionB, AssertionC, . . . ) is said to be a "node" in the network, and nodes can be linked to nodes. AssertionB may influence not only AssertionA but also AssertionH, although in a different context. Such a network is called a semantic network with "tangled Hierarchies." Thus, FIG. 2A shows a simple semantic network, and FIG. 2B shows a semantic network with tangled hierarchies.

Assertions (entities) can be linked in eight ways, each way representing a context:

1. AssertionA means what is stated. The opposite of AssertionA is also a valid meaning. AssertionB as stated influences AssertionA as stated. The opposite of AssertionB influences AssertionA the opposite way.

2. AssertionA means what is stated. The opposite of AssertionA is also a valid meaning. The opposite of AssertionB influences AssertionA as stated. AssertionB as stated influences AssertionA the opposite way.

3 AssertionA as stated is the only appropriate meaning. AssertionB as stated influences AssertionA as stated. The opposite of AssertionB is not applicable.

4. The opposite of AssertionA is the only appropriate meaning. AssertionB as stated influences AssertionA the opposite way. The opposite of AssertionB is not applicable.

5. AssertionA as stated is the only appropriate meaning. The opposite of AssertionB influences AssertionA as stated. AssertionB as stated is not applicable.

6. The opposite of AssertionA is the only appropriate meaning. The opposite of AssertionB influences the opposite of AssertionA. AssertionB as stated is not applicable.

7. AssertionA as stated is the only appropriate meaning. The acceptance of AssertionB either as stated or the opposite of AssertionB influence AssertionA in the same way.

8. The opposite of AssertionA is the only appropriate meaning. The acceptance of AssertionB either as stated or the opposite of AssertionB influence AssertionA the same way.

The various nodes of the semantic network illustrated in FIG. 1 are "entities" as illustrated in FIG. 3. These entities can be "understood" in the eight possible ways described above, depending on the context of entity relationships. An entity may be able to influence another entity either positively or negatively, denoted as "±" in FIG. 3, or negatively only, denoted as "−", or positively only, denoted as "+". Each relation may be strong, denoted by a weight of "5", or weak, denoted by a weight of "1". In FIG. 3, the chain end entities h, j, d, and k are fundamental entities. Fundamental entities need to have information about them supplied by the user of the system, or the system may invoke an external program instead of asking the user for information, requiring merely an appropriately formatted information record returned to it.

A knowledge base is created by entering an entity (assertion, question, premise, . . . ), and then entities are linked to establish the context and specify the degree of influence of each influencing assertion within each context. Additional functions supported include changing any aspect of an assertion, i.e., its linkanges, contexts, descriptive information, etc., removing a link between assertions or deleting an assertion, and accepting factual information about a domain. The inferencing and confidence factor processing of the fact based expert system according to the invention is summarized by the following pseudocode.

```
Post all USER ANSWERS from ANSWER LOG into corres-
  ponding ASSERTION records (NODES) in FIELD:
  STATECONF in FILE: TRIAL and mark these
  records as COMPLETED.
Process until all ASSERTION records are scanned in
  FILE: TRIAL and Inferences are COMPLETED.
  For current UNCOMPLETED (Inference not Made)
    record (NODE) in FILE: TRIAL determine
    COUNT of supporting LINKed records
    (NODES).
  Process all supporting LINKed records (NODES)
    for each UNCOMPLETED record.
    Accumulate each supporting INFLUENCE for
      an UNCOMPLETED record.
      Modify IMPORTANCE LEVEL (Context
        Linkage) of the LINKed NODE by
        INFLUENCE ADJUSTMENT ALGORITHM
      Determine the (+) (−) CONTEXT
        relationship between each Sup-
        porting (LINKed) NODE and the
        Supported NODE and apply to
        the Adjusted Importance Level.
        Call this the adjusted
        INFLUENCE.
      Accumulate the adjusted INFLUENCE
        for this LINKed ASSERTION (NODE).
      Establish CONFIDENCE LEVEL of this
        LINKed NODE according to
        CONFIDENCE ALGORITHM.
    End Accumulation of ONE INFLUENCE; Get
      next supporting ASSERTION
      (INFLUENCE) and Repeat until COMPLETED.
End Process
Adjust accumulated CONFIDENCE FACTOR for the
  now COMPLETED record as a function of the
  number of USER ANSWERS and valid
  INFERENCES made compared to the maximum
  possible. (Accumulated Confidences
  divided by Maximum Possible + Difference
  between Maximum and Actual, all divided by 1.5)
Normalize adjusted INFERENCES to range of −5
  to +5 by NORMALIZE INFLUENCES ALGORITHM
End Process; Get next UNCOMPLETED ASSERTION record.
```

Figure 4:
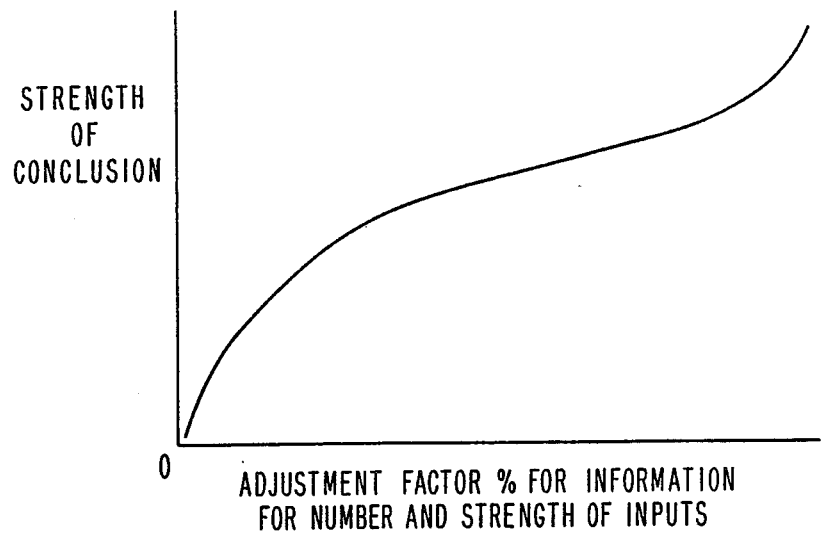
FIG. 4 is graph showing the non-linearity in the way the human brain takes in singular inputs of information and accumulates them into a conclusion/inference.
Figure 5:
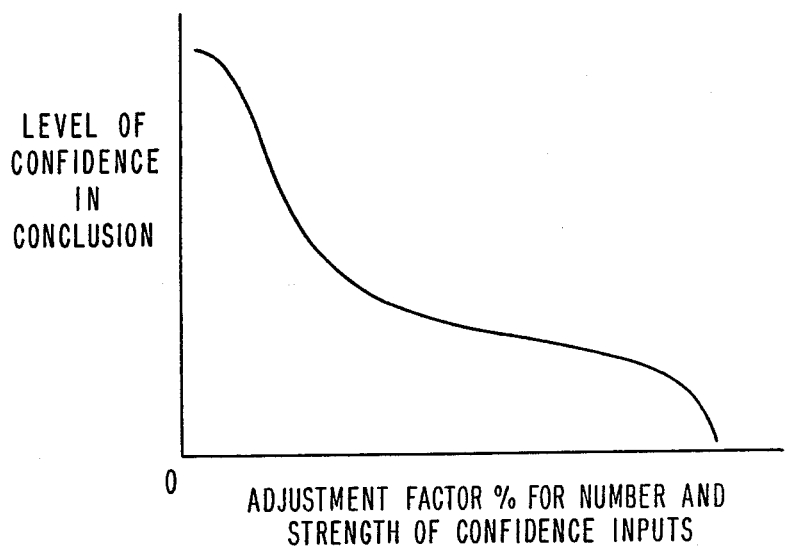
FIG. 5 is a graph showing the non-linearity in the way the human brain takes in singular inputs of confidence in information and accumulates them into a general confidence level.
Figure 6:
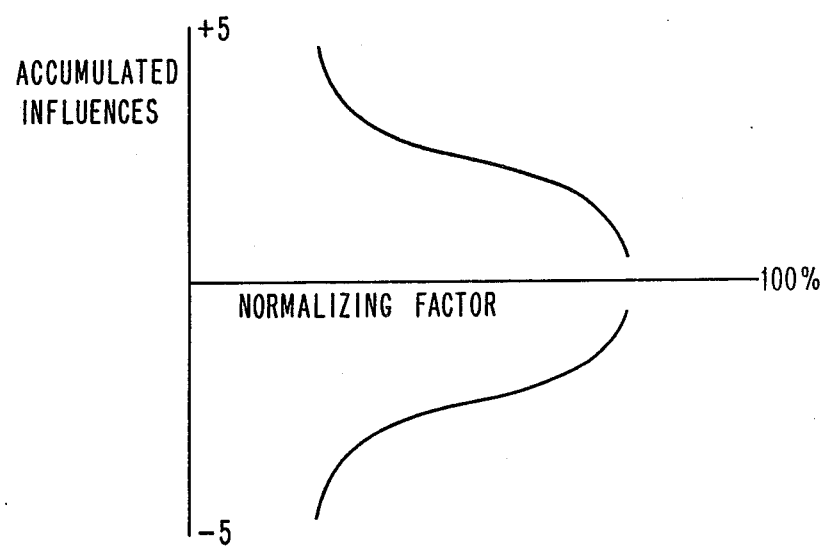
FIG. 6 is a graph showing the non-linear normalization of influences to reflect the way the human brain interprets increasing levels of accumulated information.

The logic of this processing is best illustrated by FIGS. 4, 5 and 6. FIG. 4 illustrates the INFLUENCE ADJUSTMENT ALGORITH and shows a general curve reflecting a view of non-linearity in the way the human brain takes in singular inputs of information and accumulates them into a conclusion/inference (accumulation of influences). The curve is implemented in the processing according to the invention based on the following table:

| USER'S STATED STRENGTH of INFLUENCE or STRENGTH OF SYSTEM'S INFERENCE | ADJUSTMENT |
|---|---|
| 5 | 100% * IMPORTANCE |
| 4.8 | 99% * IMPORTANCE |
| 4.6 | 96% * IMPORTANCE |
| 4.3 | 92% * IMPORTANCE |
| 4.1 | 88% * IMPORTANCE |
| 3.9 | 84% * IMPORTANCE |
| 3.7 | 78% * IMPORTANCE |
| 3.5 | 67% * IMPORTANCE |
| 3.2 | 56% * IMPORTANCE |
| 2.9 | 48% * IMPORTANCE |
| 2.7 | 41% * IMPORTANCE |
| 2.4 | 35% * IMPORTANCE |

| USER'S STATED STRENGTH of INFLUENCE or STRENGTH OF SYSTEM'S INFERENCE | ADJUSTMENT |
| --- | --- |
| 2.2 | 31% * IMPORTANCE |
| 1.9 | 26% * IMPORTANCE |
| 1.7 | 23% * IMPORTANCE |
| 1.4 | 18% * IMPORTANCE |
| 1.2 | 15% * IMPORTANCE |
| 1.0 | 12% * IMPORTANCE |
| 0.7 | 9% * IMPORTANCE |
| 0.4 | 5% * IMPORTANCE |
| >0 | 2% * IMPORTANCE |
| 0 | 0% * IMPORTANCE |

FIG. 5 illustrates the CONFIDENCE ALGORITHM and shows a general curve reflecting a view of non-linearity in the way the human brain takes in singular inputs of confidence in information and accumulates them into a general confidence level. The curve is implemented in the process according to the invention and is based on the following table:

| USER'S STATED CONFIDENCE or SYSTEM'S CONFIDENCE | ADJUSTMENT |
| --- | --- |
| >0.5 | .94 |
| >0.9 | .85 |
| >1.2 | .62 |
| >1.6 | .42 |
| >2.2 | .28 |
| >2.6 | .21 |
| >2.9 | .17 |
| >4.6 | .11 |
| >4.0 | .10 |
| >4.4 | .07 |
| >4.8 | .06 |
| >4.9 | .05 |
| OTHERWISE | 0.0 |

FIG. 6 illustrates the NORMALIZED INFLUENCES ALGORITHM and shows a general curve reflecting a view of non-linear normalization of influences to reflect the way the human brain interprets increasing levels of accumulated information. The curve is implemented in the process of the invention and is based on the following table:

```
ACCUMULATED INFLUENCES <= 1.5 AND ACCUMULATED
    INFLUENCES >= -1.5
ACCUMULATED INFLUENCES = ACCUMULATED
    INFLUENCES
ACCUMULATED INFLUENCES <= 2.7 AND ACCUMULATED
    INFLUENCES >= -2.7
    ACCUMULATED INFLUENCES = ACCUMULATED
        INFLUENCES * .95
ACCUMULATED INFLUENCES <= 4.2 AND ACCUMULATED
    INFLUENCES >= -4.2
    ACCUMULATED INFLUENCES = ACCUMULATED
        INFLUENCES * .86
ACCUMULATED INFLUENCES <= 5.6 AND ACCUMULATED
    INFLUENCES >= -5.6
    ACCUMULATED INFLUENCES = ACCUMULATED
        INFLUENCES * .74
ACCUMULATED INFLUENCES <= 7.5 AND ACCUMULATED
    INFLUENCES >= -7.5
    ACCUMULATED INFLUENCES = ACCUMULATED
        INFLUENCES * .63
ACCUMULATED INFLUENCES <= 9 AND ACCUMULATED
    INFLUENCES >= -9
    ACCUMULATED INFLUENCES = ACCUMULATED
        INFLUENCES * .51
ACCUMULATED INFLUENCES <= 10.6 AND ACCUMULATED
    INFLUENCES >= -10.6
    ACCUMULATED INFLUENCES = ACCUMULATED
        INFLUENCES * .43
ACCUMULATED INFLUENCES <= 12 AND ACCUMULATED
    INFLUENCES >= -12
    ACCUMULATED INFLUENCES = ACCUMULATED
        INFLUENCES * .40
OTHERWISE
    ACCUMULATED INFLUENCES = MAXIMUM LEVEL
        (+5 OR -5)
```

Figure 7:
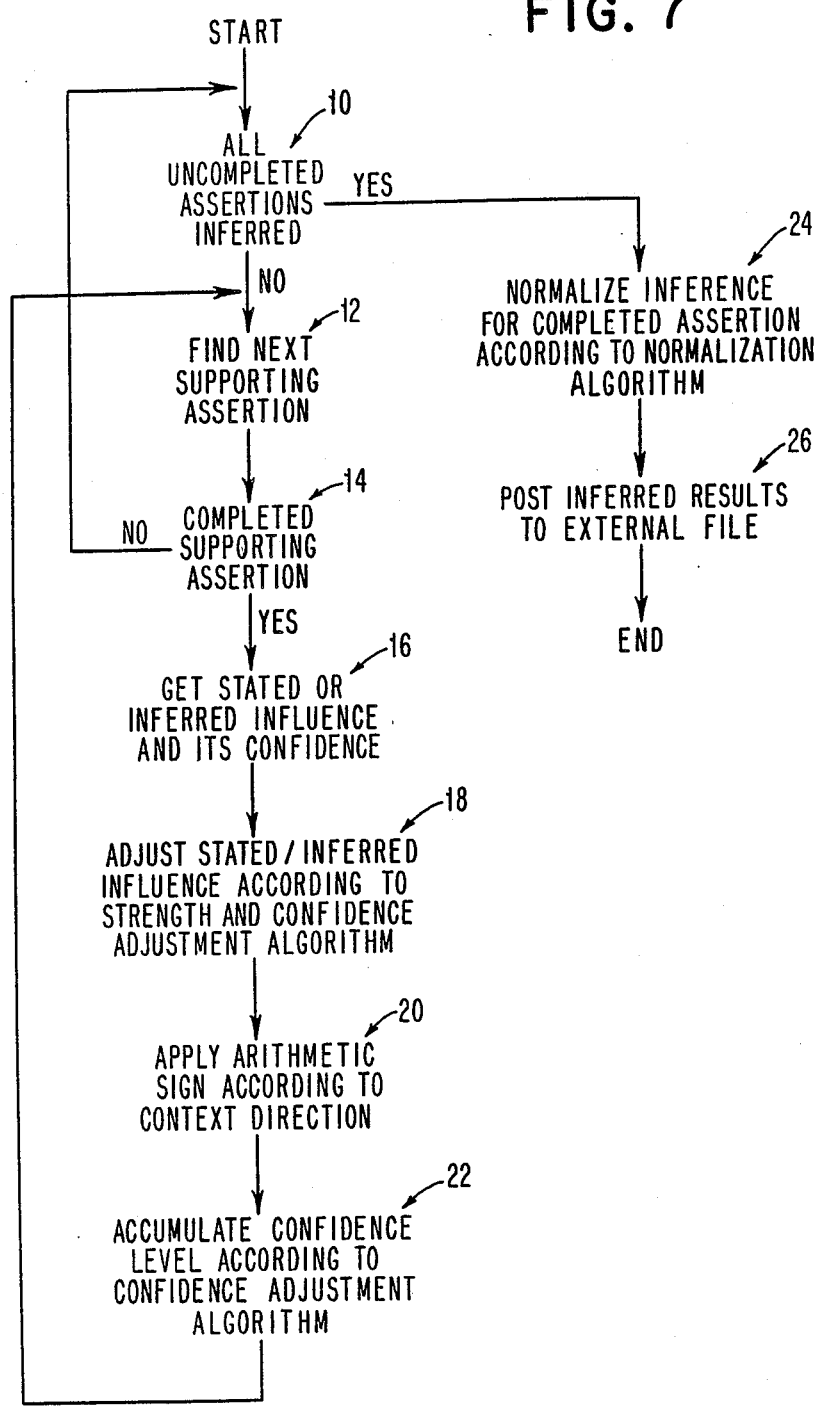
FIG. 7 is a flow diagram of the logic of the fact based inference engine for an expert system according to the invention.

To better understand the invention, reference is next made to FIG. 7 which shows a flow diagram of the pseudocode logic for the inferencing and confidence processing according to the invention. Processing by the inference engine begins by a test in decision block 10 to determine if all uncompleted assertions have been inferred. If not, the next supporting assertion is found in function block 12, and a test is made in decision block 14 to determine if this is a completed supporting assertion. If not, control returns to decision block 10; otherwise, the stated or inferred influence and its confidence are retrieved in function block 16. Then, in function block 18, the stated or inferred influence is adjusted according to the strength and confidence adjustment algorithm illustrated in FIG. 4. Next, in function block 20, the arithmetic sign according to the context direction is applied. The confidence level of this supporting assertion is accumulated in function block 22 according to the confidence adjustment algorithm illustrated in FIG. 5. At this point, control returns to function block 12 to find the next supporting assertion. Finally, when all uncompleted assertions have been inferred as determined by a true output for the test made in decision block 10, in function block 24 the inference for the completed assertion is normalized to +5/−5 according to the normalization algorithm illustrated in FIG. 6. Then, in function block 26, the inferred results are posted to an external file for review and analysis.

The inference engine according to the invention normally traverses the network following all linkages forward and backward in examining the "world it understands". Based on the analysis made by the inference engine, an opinion is generated coupled with the confidence the inference engine has in that opinion. If the inference engine has little confidence in an opinion or recommendation, it may be because too few prompts were answered by the user or that there was little confidence in much of the information provided by the user. It is possible that opinions offered by the inference engine seem inconsistent or do not make sense. If the knowledge base appears correct and reasonable, and if the phrasing of the assertions and prompts are reasonable and clear, then there are either inconsistent answers provided by the user to the prompts or the situation itself has inconsistencies or difficulties which were not previously understood. In the latter case, the knowledge base may be incorrect or significantly incomplete. However, assuming a reasonably complete knowledge base and consistent answers to prompts by the user, the inference engine is capable of providing recommendations with assigned levels of confidence.

Figure 8:
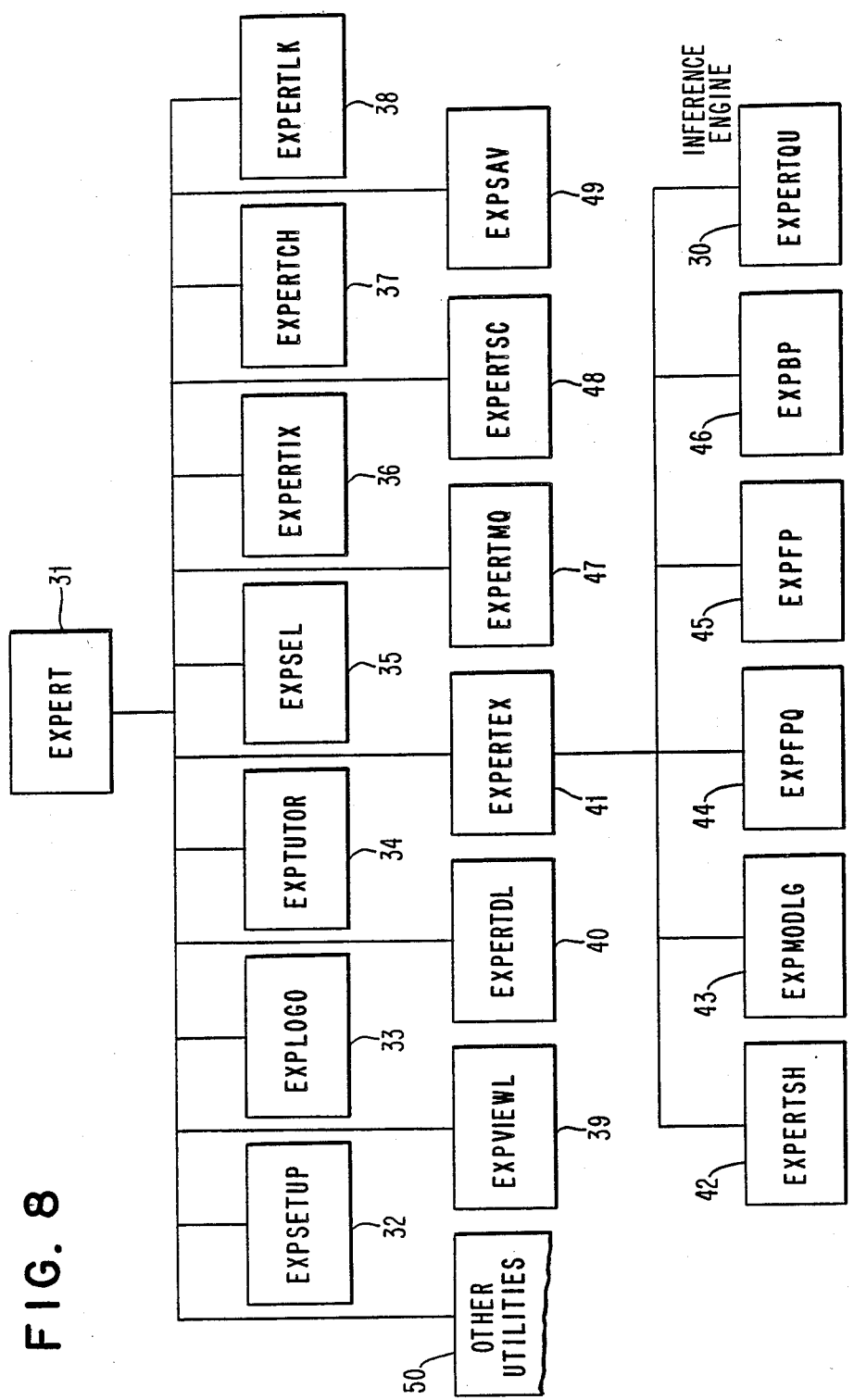
FIG. 8 is a block diagram showing an expert system incorporating the inference engine according to the invention.

The inference engine is preferrably incorporated as a module in an expert system, itself being of modular design, generally shown in FIG. 8. The block diagram shown in FIG. 8 is in the form of a generally hierarchical tree structure which is analogous to the hierarchical tree structure of the IBM Personal Computer Disk Operating System (DOS) wherein the root module makes calls to other modules of the system. All the modules of the illustrated expert system are of conventional design except for the inference engine, shown at reference numeral 30. The root module of the system is EXPERT.PRG 31 which is the system menu and control program. The following table shows the tree diagram and describes what each of the other modules in the system is.

```
EXPERT.PRG 31 (system menu and control program)
    EXPSETUP.PRG 32 (set system configuration)
    EXPLOGO.PRG 33 (display screen logo)
    EXPTUTOR.PRG 34 (online tutorial)
    EXPSEL.PRG 35 (select knowledge base)
    EXPERTIN.PRG 36 (enter new knowledge base
        assertions)
        EXPTUTOR.PRG 34 (online tutorial)
    EXPTCH.PRG 37 (change knowledge base
        assertions)
        EXPTUTOR.PRG 34 (online tutorial)
    EXPERTLK.PRG 38 (set context languages)
        EXPTUTOR.PRG 34 (online tutorial)
    EXPVIEWL.PRG 39 (view answer log)
    EXPERTDL.PRG 40 (delete an assertion record
        or remove a context language)
        EXPDELB.PRG (remove forward pointers)
        EXPDELF.PRG (remove backward pointers)
    EXPERTEX.PRG 41 (receive user input and
        invoke inference engine)
        EXPERTSH.PRG 42 (display recommendation)
        EXPMODLG.PRG 43 (modify answer log)
        EXPFPQ.PRG 44 (prompt for user input)
        EXPFP.PRG 45 (set up trial inferencing
            structure using forward pointers)
            EXPFPQ.PRG 44 (prompt for user
                input)
        EXPBP.PRG 46 (set up trial inferencing
            structure using backward pointers)
            EXPFPQ.PRG 44 (prompt for user
                input)
        EXPERTQU.PRG 30 (inference engine)
    EXPERTMQ.PRG 47 (modify user prompt set)
        EXPERTM1.PRG (set up prompt work files)
        EXPERTM2.PRG (update prompt files)
        EXPERTM3.PRG (validate prompt entries)
    EXPERTSC.PRG 48 (scan knowledge base records)
        EXPTUTOR.PRG 34 (online tutorial)
        EXPSCL.PRG (scan all assertion record
            context linkages)
        EXPSCV.PRG (scan single assertion
            record)
        EXPSCC.PRG (scan all assertion records)
        EXPSCS.PRG (hierarchical presentation of
            knowledge base)
    EXPSAV.PRG 49 (save files)
    EXPUTIL.PRG 50 (other utilities)
        EXPLLIST.PRG (print the answer log)
        EXPERASE.PRG (delete knowledge bases
            and/or answer logs)
        EXPEXIM.PRG (export/import a knowledge
            base)
        EXPCLONE.PRG (clone a knowledge base for
            testing)
        EXPMOVLG.PRG (offload/reload answer log
            for security)
```

It will be observed that the various modules may call other modules on the same or lower level. For example, EXPTUTOR.PRG 34 is callable by several other modules on the same level, and EXPERTEX.PRG 41 calls several other modules at a lower level, including the inference engine 30. The expert system shown in the block diagram of FIG. 8 is merely exemplary, representing as it does a preferred environment for the inference engine according to the invention. Not all the modules shown are required for a working system and other modules may be added depending on design choice. Moreover, it is not necessary to incorporate the inferenece engine into an expert system of modular design, as the principles of the inference engine may be used in other and different expert systems.

What has been described is a new fact-based (semantic network) expert system which is capable of handling indeterminate problems with a high level of confidence. While the invention has been described in terms of a single preferred implementation, those skilled in the art will recognize that the invention can be practiced in various implementations within the spirit and scope of the appended claims.

Having thus described my invention, what I claim as new and desire to secure by Letters Patent is as follows:

1. A method of inference processing in a fact-based expert system comprising the steps of:
    generating a knowledge base by inputting and linking conceptual entities to create a network;
    assigning a qualitative value to relationships between entities;
    processing said knowledge base to solve a problem within a domain defined by said network by traversing said network following all linkages forward and backward;
    adjusting and accumulating said qualitative values for each entity processed; and
    generating a result and confidence measure thereof based on the assigned relationship values.

2. A method of inference processing in a fact-based expert system comprising the steps of:

generating a knowledge base by inputting assertions, assigning confidence levels to the assertions, and linking the assertions to create a network;

processing said knowledge base to solve a problem within a domain made up of a network of assertions, wherein any assertion may be simultaneously linked to any number of other assertions in the network located at any level, said processing step including traversing said network following all linkages forward and backward, for each completed supporting assertion, retrieving its stated or inferred influence and confidence while following user directives to ignore specified supporting assertions, adjusting stated or inferred influence according to a strength and confidence adjustment algorithm, applying an arithmetic sign according to a context direction of the assertion, accumulating a confidence level for the assertion according to a confidence adjustment algorithm, then normalizing an inference for completed assertions; and posting the results of said processing step with a confidence level.

3. The method according to claim 2 wherein the step of adjusting is performed with a strength and confidence adjustment algorithm that reflects a hypothesized reaction of the human brain to extremes in intensity of belief.

4. The method according to claim 3 wherein the algorithm used in the step of adjusting further reflects a hypothesized reaction of the human brain to the simultaneous existence of multiple supporting facts, some of which may conflict with one another, some of which may, in isolation, infer different conclusions, and some of which may be more consequential than others.

5. The method according to claim 4 wherein the context direction in the applying step is the link between the supported and supporting assertion and the sign is developed as the result of analysis of the context and the current nature of the supporting influence as stated or previously inferred.

6. The method according to claim 5 wherein there are eight possible contexts.

* * * * *